United States Patent [19]

Holsinger et al.

[11] Patent Number: 5,367,529
[45] Date of Patent: Nov. 22, 1994

[54] APPARATUS AND METHOD FOR IMPROVED TIME SYNCHRONIZATION OF PULSED LASER SYSTEMS

[75] Inventors: Kevin K. Holsinger, Menlo Park; David L. Wright, Redwood City, both of Calif.

[73] Assignee: Spectra-Physics Lasers, Inc., Mountain View, Calif.

[21] Appl. No.: 77,301

[22] Filed: Jun. 15, 1993

[51] Int. Cl.$^5$ .......................................... H01S 3/098
[52] U.S. Cl. ...................................... 372/30; 372/18; 372/25; 372/38; 372/32
[58] Field of Search ...................... 372/18, 25, 26, 30, 372/29, 38, 32

[56] References Cited

U.S. PATENT DOCUMENTS 4,685,111  4/1987  Baer ...................................... 372/29
4,896,324  1/1990  Bull et al. ............................. 372/32

OTHER PUBLICATIONS

D. E. Spence, et al., *Time Synchronization Measurements Between Two Self-Modelocked Ti:sapphire Lasers*, 1992 (Abstract) No month available.
D. E. Spence, et al., *Time Synchronization Measurements Between Two Self-Modelocked Ti:sapphire Lasers*, 1992 (Full Paper) No month available.
M. J. W. Rodwell, et al., *Reduction of timing fluctuations in a mode-locked Nd:YAG laser by electronic feedback*, 1986, pp. 638–640 (Oct.).
S. P. Dijaili, et al., *Timing synchronization of a passively mode-locked dye laser using a pulsed optical phase lock loop*, 1989, pp. 418–420 (Jul.).
A. J. Taylor, et al., *Timing jitter in mode-locked and gain-switched InGaAsP injection lasers*, 1986, pp. 681–683 (Sep.).
S. B. Darack, et al., *Timing-jitter stabilization of a colliding-pulse mode-locked laser by active control of the cavity length*, 1991, pp. 1677–1679 (Nov.).
D. E. Spence, et al., *Regeneratively initiated self-mode-locked Ti:sapphire laser*, 1991, pp. 1762–1764 (Nov.).
J. Kluge, et al., *Fluctuations in synchronously mode-locked dye lasers*, 1984, pp. 271–277 (Sep.).
Mark J. W. Rodwell, et al., *Subpicosecond Laser Timing Stabilization*, 1989, pp. 817–827 (Apr.).
D. R. Walker, et al., *Reduction of Phase Noise in Passively Mode-Locked Lasers*, 1992, pp. 289–296 (Jan.).
D. von der Linde, *Characterization of the Noise in Continuously Operating Mode-Locked Lasers*, 1986, pp. 201–217 (Dec.).
Mark J. W. Rodwell, *Picosecond Electrical Wavefront Generation and Picosecond Optoelectronic Instrumentation*, 1987, pp. 145–173 (Dec.).
Lightwave Electronics, *Series 1000 Timing Stabilizer* brochure, 1990 ? No month available.

*Primary Examiner*—Rodney B. Bovernick
*Assistant Examiner*—Robert McNutt
*Attorney, Agent, or Firm*—Haynes & Davis

[57] ABSTRACT

Phase-locking means are provided for synchronizing the pulse timing of two (or more) passively mode-locked pulsed lasers. The phase-locking is carried out at a frequency much higher than that of the fundamental repetition rate of the lasers because it results in much higher sensitivity. The signal from the two bandpass filters is applied to a phase detector. A phase-locked loop circuit ("PLL") is employed to generate an error signal which is applied to a piezoelectric transducer ("PZT") attached to a mirror in one of the laser cavities. Corrections in the position of the mirror driven by the error signal help reduce the effects of phase noise in the relative fundamental repetition frequencies of the two lasers so that they are effectively synchronized with one another with a "jitter" of less than 1 ps.

4 Claims, 3 Drawing Sheets

APPARATUS AND METHOD FOR IMPROVED TIME SYNCHRONIZATION OF PULSED LASER SYSTEMS

BACKGROUND OF THE INVENTION

1. Field of the Invention

This invention relates generally to the field of methods and apparatus for synchronizing signals. More particularly the present invention relates to the field of methods and apparatus for synchronizing two or more pulsed lasers so that their respective pulses are synchronized in time to within less than 1 picosecond.

2. The Prior Art

Mode-locked laser systems, when combined with optical pulse compression techniques, are capable of generating extremely short optical pulses, making such devices attractive for a variety of time-resolved measurements such as time-resolved spectroscopy, electro-optic sampling, photo-enhanced electron-beam probing of integrated circuits, and electromagnetic transient measurements in semiconductors. Such measurements are often made by pumping or exciting the target with the pulsed laser and subsequently probing the target with a delayed portion of the same optical pulse, suppressing the effect of pulse timing fluctuations.

Under certain circumstances it is most advantageous to carry out such pump-probe measurements using different wavelengths (and different light sources) for the pump beam and the probe beam. In such systems, fluctuations of the laser pulse timing degrade the time resolution in proportion to the uncertainty of the pulse arrival time. Accordingly, the use of two (or more) lasers has not, until recently, provided an attractive solution for dual-wavelength pump-probe measurements because the pulse sequence from one laser is, in general, not well correlated with that from the other because of the presence of timing jitter in the outputs.

Passively mode-locked lasers have often been preferred when the shortest possible pulse durations are required. The random nature of the pulse evolution in a passively mode-locked system further complicates the problem of synchronizing two such systems. It is well known that the pulse repetition rate of a passively mode-locked laser is determined by its cavity length. This means that any random fluctuation in the effective cavity length will result in a corresponding variation in the pulse repetition frequency, which manifests itself as phase noise (also referred to as "pulse timing jitter" or simply "jitter") on the mode-locked output. The rms timing jitter $\Delta t_{rms}$ that arises from a cavity length change of $\Delta l_{pk-pk}$ in a cavity of length L, at a frequency F, is given by the equation:

$$\Delta t_{rms} = \frac{\Delta l_{pk-pk}}{4\sqrt{2}\,\pi L F} \qquad \text{EQ. 1}$$

Accordingly, for a cavity of length L=1.875 meters, which corresponds to a nominal 80 MHz repetition rate, a change in cavity length of only 10 nm (10 nm pk-pk jitter) at a 200 Hz fluctuation rate will result in an rms pulse timing jitter of about 1.5 pS (picoseconds). Conversely, to reduce the pulse timing jitter at 200 Hz to the order of the length of a typical pulse duration or less ($\leq 100$ fS (femtoseconds)), the cavity length must be controlled to an accuracy of approximately 0.7 nm.

In order to obtain a cross-correlation between the output of two passively mode-locked lasers it is desirable that their cavity periods be precisely matched. Furthermore, the pulses must be synchronized at some initial time. If, at some later time, one of the laser cavity periods changes then its pulses will walk off temporarily due to the change in repetition frequency. Simply matching the two cavity lengths again is not sufficient to re-establish the cross-correlation because although both lasers may have the same repetition frequencies, the pulse trains can be out of synchronism. The cavity length must therefore be adjusted to bring the pulses back into phase and then maintain their temporal coincidence.

Prior art schemes for jitter reduction have not been successful in reducing jitter substantially below about 1 pS. See, e.g., "Reduction of timing fluctuations in a mode-locked Nd:YAG laser by electronic feedback", Rodwell et al., Optics Letters, Vol. 11, No. 10, p. 638 (October, 1986); "Timing-Jitter Stabilization of a colliding-pulse mode-locked laser by active control of the cavity length", Darack et al., Optics Letters, Vol. 16, No. 21, p. 1677 (Nov. 1, 1991); "Series 1000 Timing Stabilizer", Lightwave Electronics. Accordingly, a need exists for an improved method and apparatus for reducing timing jitter well below 1 pS.

BRIEF DESCRIPTION OF THE INVENTION

While the present invention has broad application to the precise synchronization of many types of electrical, optical, and electro-optical signals, it will be discussed herein primarily in terms of its application to the synchronization of a pair of passively mode-locked lasers.

In accordance with a first aspect of the present invention, phase-locking means are provided for synchronizing the pulse timing of two (or more) passively mode-locked pulsed lasers. Such lasers have a fundamental pulse repetition frequency corresponding to their cavity length. Associated with each laser is a high speed photodiode and a bandpass filter. The photodiode generates a "comb" in frequency space consisting of a super-wideband signal comprising amplitude spikes out to over 100 times the fundamental repetition frequency of the lasers. The bandpass filters select a band of frequencies whose base frequency is much greater than the fundamental repetition frequency of the two lasers. The phase-locking is carried out at a frequency much higher than that of the fundamental repetition rate of the lasers because it results in much higher sensitivity, i.e., a phase error of 1 degree at 80 MHz represents a much bigger error in time than a phase error of 1 degree at 8000 MHz. The signal from the two bandpass filters is applied to a phase detector. A phase-locked loop circuit ("PLL") is employed to generate an error signal which is applied to a piezoelectric transducer ("PZT") attached to a mirror in one of the laser cavities. Corrections in the position of the mirror driven by the error signal help reduce the effects of phase noise in the relative fundamental repetition frequencies of the two lasers so that they are effectively synchronized with one another with a "jitter" of less than 1 pS.

According to a second and presently preferred aspect of the present invention, a mixer, and an amplifier are also associated with each of the lasers to be phase-locked. A local oscillator ("LO") having a frequency set to the base frequency of the bandpass filters offset by an intermediate frequency ("IF") is fed to each mixer. The bandpass filters select a small predetermined band of frequencies ("A") near the LO for application to the mixers. The mixers mix the LO with the small predetermined band of frequencies to form signals corresponding to LO+A, LO−A, LO, and A. The outputs of the mixers are amplified and low-pass filtered to select the LO-A signal. The LO-A signals (at the IF, a much lower frequency than LO, for example, 50 KHz–20 MHz) from each laser are then applied to a phase detector and conventional PLL circuitry yielding an error signal which is used to position a PZT controlling the position of one of the mirrors in the cavity of one of the lasers, as before. The advantage of this aspect of the invention is that the advantages of high sensitivity achievable by working at frequencies much higher than the fundamental repetition rate of the lasers are achieved, while the bulk of the electronics need only operate in the 50 KHz–20 MHz range, where cheaper and more conventional components and techniques may be used, thus significantly reducing cost.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Figure 2:
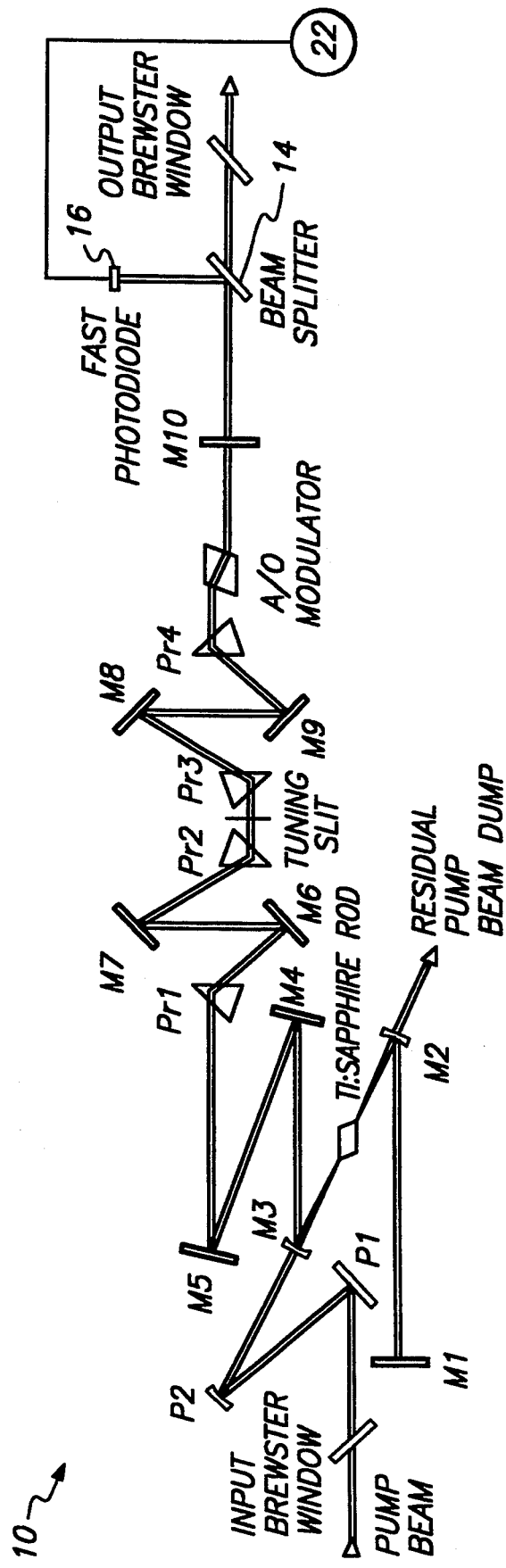
FIG. 2 is a schematic diagram of a typical passively mode-locked Ti:Sapphire laser.
Figure 3:
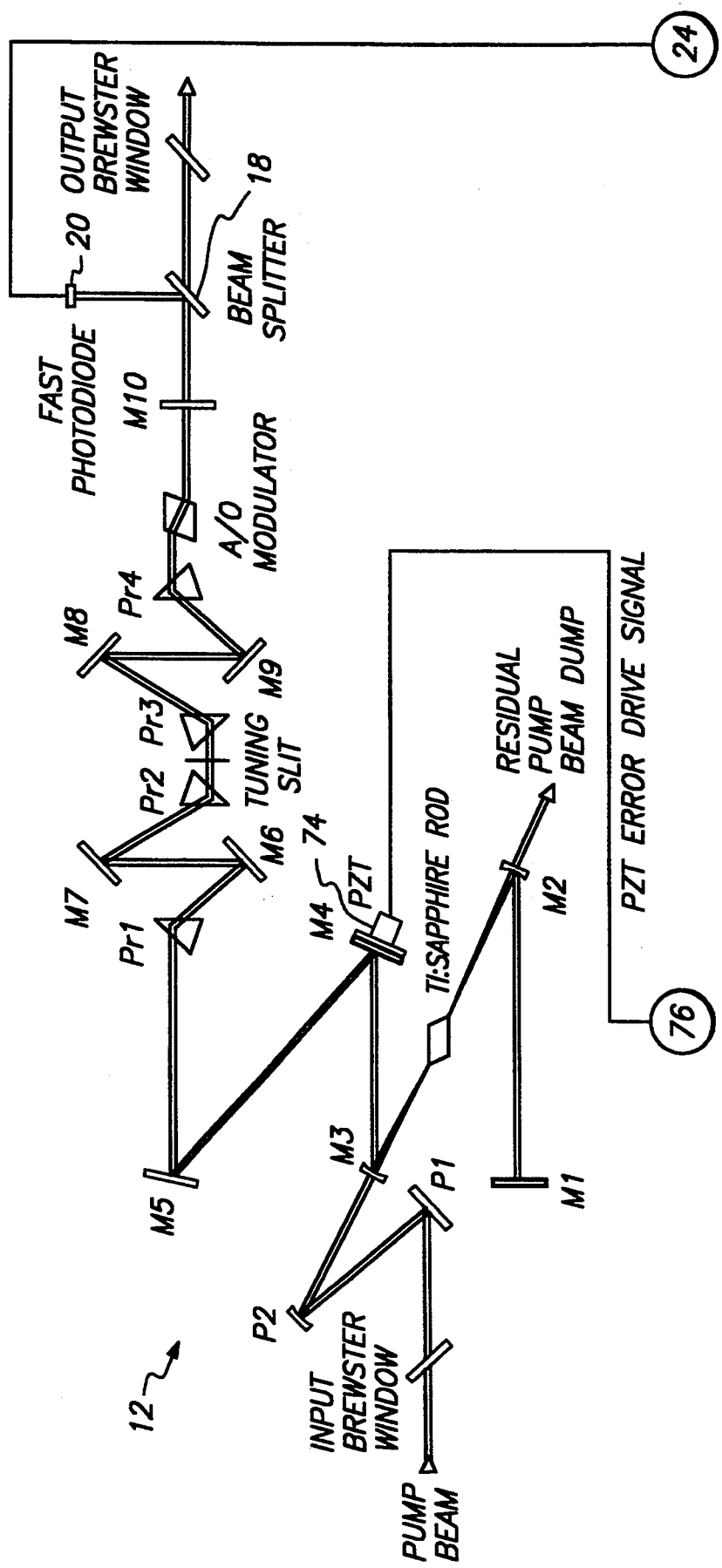
FIG. 3 is a schematic diagram of a passively mode-locked Ti:Sapphire laser modified to incorporate the present invention.

In accordance with a presently preferred embodiment of the present invention, a pair of passively mode-locked Ti:Sapphire lasers are provided. FIG. 2 depicts a conventional Ti:Sapphire laser such as a Model 3960 "Tsunami" Mode-Locked Ti:Sapphire laser available from Spectra-Physics Lasers, Inc. of Mountain View, Calif. FIG. 3 depicts a Ti:Sapphire laser modified to operate with the present invention.

Figure 1:
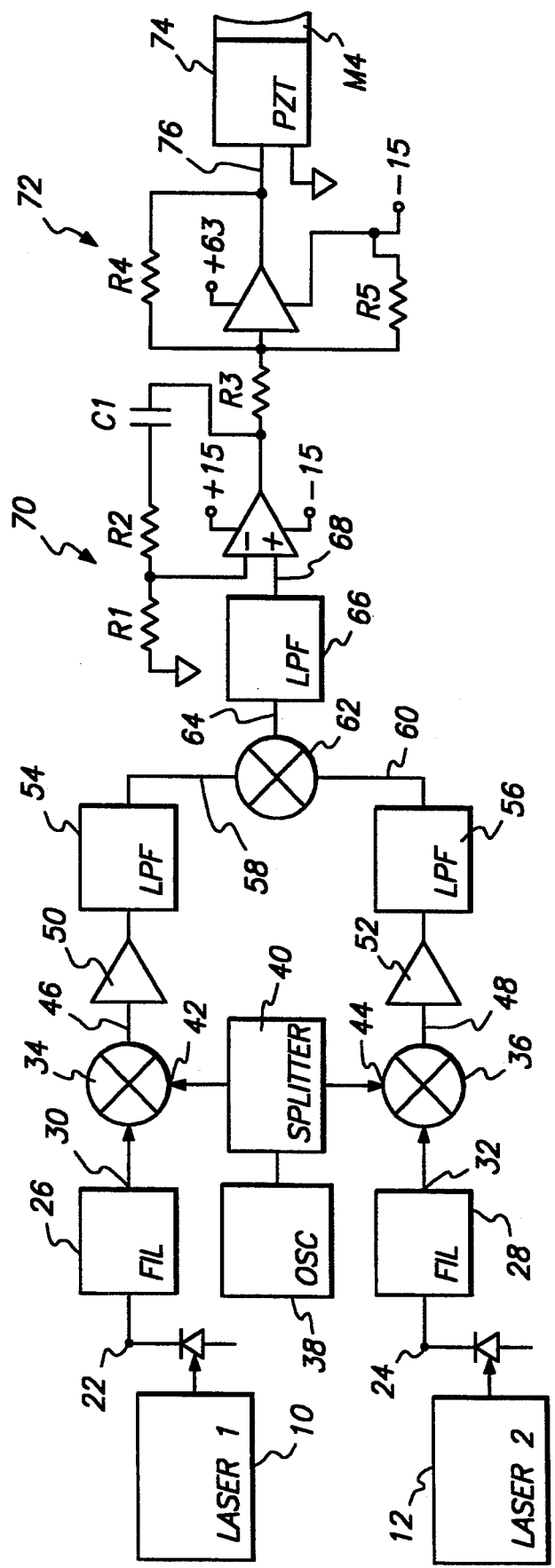
FIG. 1 is a block and schematic diagram of the pulse timing jitter reduction system.

Turning now to FIG. 1, a pair of lasers 10, 12 are shown. Laser 10 is substantially represented by the schematic diagram of FIG. 2. Laser 12 is substantially represented by the schematic diagram of FIG. 3.

Laser 10 is provided with a beam splitter 14 which provides a small portion of the output beam to a fast photodiode 16 such as an Antel ARS-2 available from Antel Optics, Inc. of Burlington, Ontario, Canada. Photodiode 16 has a rise time of approximately 60 pS, and is thus capable of generating a signal of frequency as high as 8 GHz and beyond corresponding to the time varying intensity of lasers 10 and 12. Similarly, laser 12 is provided with a similar beam splitter 18 and photodiode 20. Similarly capable phototransistors and equivalent photodetection devices could also be used.

Photodiodes 16 and 20 respond to the fundamental repetition frequency of the laser as well as harmonics thereof. Passively mode-locked lasers are pulsed in nearly impulse function fashion, having pulse widths of the order of 1 pS (a signal with a duty cycle on the order of 0.0001 or 1 pS out of 10 nS). The rise times of the actual optical signals are, at most, 0.5 pS. The bandwidth of the signal from photodiodes 16 and 20 to the 3 db roll-off points can be approximated according to the following equation:

$$BANDWIDTH \times RISE\ TIME = 0.35 \qquad \text{EQ. 2}$$

Since the rise time is 60 pS, the bandwidth is about 5.8 GHz. As a result, photodiodes 16, 20 are able to measure a signal rich in harmonics out to beyond 8 GHz. Note that the signal produced by the pulsed lasers is rich in harmonics well beyond 8 GHz. According to the presently preferred embodiment of the present invention, significant advantages over prior art phase-locking systems are derived by working at about 8–10 GHz, or roughly 100 times the pulse repetition frequency of the lasers, about 80 MHz.

The sensitivity of a phase-locking system increases with frequency. This is because a 1 degree error at 80 MHz represents $1/360 \times 1/80$ MHz, or roughly 35 pS whereas a 1 degree error at 8000 MHz (8 GHz) represents 1/100 the time error, or 0.35 pS. It is thus advantageous to carry out such a phaselocking scheme at the highest frequencies possible, however, component costs for such high frequency regimes can be prohibitive. Accordingly, means is provided herein for implementing the bulk of the electronics needed so that operational frequencies beyond 20 MHz are not required.

Electrical signals from photodiodes 16, 20 are respectively provided to circuit nodes 22, 24. The signals are respectively applied to a bandpass filter 26, 28. Bandpass filters 26, 28 should be selected for low loss at 8 GHz (assuming that is the working frequency, as presently preferred), more than 20 db loss below 6 GHz and above 10 GHz, and a 50 ohm impedance. The respective bandpass filter outputs 30, 32 ("$A_1$","$A_2$") are then applied respectively to mixers 34 and 36. Mixers 34 and 36 are preferably an Anaren Mode 72128 doubly balanced mixer for the 4.5–12.0 GHz band available from Anaren Microwave, Inc. of Syracuse, N.Y. Many equivalent devices could also be used. An LO signal, preferably much greater than the typical laser repetition frequency of about 80 MHz (such repetition frequencies for typical commercially available Ti:Sapphire lasers vary from a low of about 76 MHz to a high of about 100 MHz although a range of about 10–200 MHz is practically feasible), and, for an 80 MHz laser, preferably set to 8.010 GHz is generated by a super-stable oscillator 38 such as an HP-83711A available from the Hewlett-Packard Company of Cupertino, Calif. Oscillator 38 preferably has a frequency stability of 1 ppm. An equivalent oscillator could be used. Because any noise or drift on oscillator 38 is common-mode (common to both signal paths), frequency stability of the order of 1 ppm is adequate. The signal from oscillator 38 is split by a signal splitter 40, well known to those of skill in the art, and applied in phase to inputs 42 and 44 of mixers 34 and 36. Mixers 34 and 36 generate signals corresponding to LO+$A_1$, LO−$A_1$, LO, and $A_1$ on line 46 and LO+$A_2$, LO−$A_2$, LO, and $A_2$ on line 48. Amplifiers 50, 52 and low-pass filters 54, 56 process these signals in a conventional manner so that signals indicative of the relative phases of the lasers at an intermediate frequency ("IF") of about 10 MHz appear on lines 58 and 60.

While it is possible to carry out the phase detection directly at 8–10 GHz by using appropriate electrical components, such is not presently preferred because of the advantages of working at lower IF frequencies such as 50 KHz–20 MHz where less expensive, more commonly available components may be employed.

The signals on lines 58 and 60 are provided to phase detector 62, preferably a Minicircuits MPD-2 phase detector or equivalent available from Mini-Circuits Corporation of Brooklyn, N.Y. An output signal from the phase detector 62 on line 64 is provided to low-pass filter 66 and is output on line 68 as an error signal. The error signal on line 68 is applied to a loop compensator 70 and then to the drive circuitry 72 for PZT 74. The loop compensator 70 is of a conventional design well known to those of ordinary skill in the art. The drive circuitry 72 is preferably a PA-12 power op amp available from Apex Microtechnology Corporation of Tucson, Ariz. and is set up to provide an output voltage to PZT 74 which varies between −15 and +63 volts as is well understood by those of ordinary skill in the art. PZT 74 is, for example, a model NLA-5×5×9 available from Tokin America, Inc. of San Jose, Calif. PZT 74 is attached to mirror M4 by an epoxy adhesive, preferably BIPAX® TRA-BOND No. BB-2151 available from TRA-CON of Medford, Mass. PZT 74 is electrically connected to drive circuitry 72 by line 76. PZT 74 is a piezoelectric transducer capable of a total of 6.5 μm movement over a range of 100 volts of applied voltage.

Thus, the signal applied to PZT 74 varies the length of the cavity of laser 12 (FIG. 3) in response to high frequency variations in the relative pulse repetition frequencies of the two lasers so that the in-phase relationship of the output beams of lasers 10 and 12 is maintained to within less than 1 pS despite the presence of phase noise.

While embodiments and applications of this invention have been shown and described, it would be apparent to those skilled in the art that many more modifications than mentioned above are possible without departing from the inventive concepts herein. For example, it would be clear to those of ordinary skill in the art that this invention may be used with many types of repeating pulse lasers as well as mode-locked Ti:Sapphire lasers. Similarly, any source rich in harmonics and capable of electronic frequency variation may be synchronized to any other similar source using this invention. The invention, therefore, is not to be restricted except in the spirit of the appended claims.

What is claimed is:

1. A method for temporally synchronizing a first and second passively mode-locked laser each having a same fundamental repetition frequency comprising the steps of:
   a. measuring the intensity of a portion of the output beam of the first and second laser with a device capable of measuring rise times of less than 60 pS to generate a first signal corresponding to the time varying intensity of the first laser and a second signal corresponding to the time varying intensity of the second laser;
   b. selectively filtering said first signal and said second signal to provide respectively a first filtered band of signals and a second filtered band of signals, said first filtered band of signals and said second filtered band of signals having a base frequency substantially greater than the fundamental repetition frequency;
   c. applying a local oscillator signal in phase to a first input of each of a first and second mixer, said local oscillator signal a sine wave of frequency equal to said base frequency offset by an intermediate frequency of from 50 KHz to 20 MHz;
   d. applying said first filtered band of signals to a second input of said first mixer and said second filtered band of signals to a second input of said second mixer;
   e. low-pass filtering an output of said first mixer and an output of said second mixer to form a first filtered IF signal and a second filtered IF signal;
   f. applying said first filtered IF signal to a first input of a phase detector and said second filtered IF signal to a second input of a phase detector, said phase detector capable of generating an error signal;
   g. converting said error signal into a PZT signal;
   h. applying said PZT signal to a PZT attached to a mirror in a resonant cavity of the second passively mode-locked laser to vary the cavity length of said resonant cavity.

2. A system for reducing pulse timing jitter in a first and second mode-locked laser each having the same fundamental repetition frequency comprising:
   a first device capable of measuring rise times of less than 60 pS exposed to the output beam of the first laser and adapted to generate a first signal corresponding to the time varying intensity of the output beam;
   a second device capable of measuring rise times of less than 60 pS exposed to the output beam of the second laser and adapted to generate a second signal corresponding to the time varying intensity of the output beam;
   a first bandpass filter electrically connected to said first device capable of selectively filtering said first signal to provide a first filtered band of signals having a base frequency substantially greater than the fundamental repetition frequency;
   a second bandpass filter electrically connected to said second device capable of selectively filtering said second signal to provide a second filtered band of signals having said base frequency;
   a local oscillator capable of generating an LO signal consisting of a sine wave of frequency equal to said base frequency offset by an intermediate frequency of from 50 KHz to 20 MHz;
   a first mixer having as a first input said first filtered band of signals and as a second input said LO signal and as an output a first mixed signal;
   a second mixer having as a first input said second filtered band of signals and as a second input said LO signal and as an output a second mixed signal;
   a first low-pass filter connected to said output of said first mixer and having an output carrying a first IF signal;
   a second low-pass filter connected to said output of said second mixer and having an output carrying a second IF signal;
   a phase detector having a first input connected to said output of said first low-pass filter and a second input connected to said output of said second low-pass filter and an output on which is carried an error signal;
   means for converting said error signal into a PZT signal;
   means for applying said PZT signal to a PZT attached to a mirror in a resonant cavity of the second mode-locked laser to vary the cavity length of said resonant cavity.

3. A method for temporally synchronizing a first and second passively mode-locked laser each having a same fundamental repetition frequency comprising the steps of:

a. measuring the intensity of a portion of the output beam of the first and second laser with a device capable of measuring rise times of less than 60 pS to generate a first signal corresponding to the time varying intensity of the first laser and a second signal corresponding to the time varying intensity of the second laser;

b. selectively filtering said first signal and said second signal to provide respectively a first filtered band of signals and a second filtered band of signals, said first filtered band of signals and said second filtered band of signals having a base frequency substantially greater than the fundamental repetition frequency;

c. applying a local oscillator signal in phase to a first input of each of a first and second mixer said local oscillator signal a sine wave of frequency equal to said base frequency offset by an intermediate frequency;

d. applying said first filtered band of signals to a second input of said first mixer and said second filtered band of signals to a second input of said second mixer;

e. low-pass filtering an output of said first mixer and an output of said second mixer to forma first filtered IF signal and a second filtered IF signal;

f. applying said first filtered IF signal to a first input of a phase detector and said second filtered IF signal to a second input of a phase detector, said phase detector capable of generating an error signal;

g. converting said error signal into a PZT signal:

h. applying said PZT signal to a PZT attached to a mirror in a resonant cavity of the second passively mode-locked laser to vary the gravity length of said resonant cavity.

4. A system for reducing pulse timing jitter in a first and second mode-locked laser each having the same fundamental repetition frequency comprising:

a first device capable of measuring rise times of less than 60 pS exposed to the output beam of the first laser and adapted to generate a first signal corresponding to the time varying intensity of the output beam;

a second device capable of measuring rise times of less than 60 pS exposed to the output beam of the second laser and adapted to generate a second signal corresponding to the time varying intensity of the output beam;

a first bandpass filter electrically connected to said first device capable of selectively filtering said first signal to provide a first filtered band of signals having a base frequency substantially greater than the fundamental repetition frequency;

a second bandpass filter electrically connected to said second device capable of selectively filtering said second signal to provide a second filtered band of signals having said base frequency;

a local oscillator capable of generating an LO signal consisting of a sine wave of frequency equal to said base frequency offset by an intermediate frequency;

a first mixer having as a first input said first filtered band of signals and as a second input said LO signal and as an output a first mixed signal;

a second mixer having as a first input said second filtered band of signals and as a second input said LO signal and as an output a second mixed signal:

a first low-pass filter connected to said output of said first mixer and having an output carrying a first IF signal:

a second low-pass filter connected to said output of said second mixer and having an output carrying a second IF signal;

a phase detector having a first input connected to said output of said first low-pass filter and a second input connected to said output of said second low-pass filter and an output on which is carried an error signal;

means for converting said error signal into a PZT signal;

means for applying said PZT signal to a PZT attached to a mirror in a resonant cavity of the second mode-locked laser to vary the cavity length of said resonant cavity.

* * * * *